(12) United States Patent
Shekhter et al.

(10) Patent No.: US 7,354,472 B2
(45) Date of Patent: *Apr. 8, 2008

(54) METALOTHERMIC REDUCTION OF REFRACTORY METAL OXIDES

(75) Inventors: Leonid Natan Shekhter, Ashland, MA (US); Edward V. McCormick, Churchville, NY (US); Leah F. Simkins, Arlington, MA (US); Edward K. Schiele, Libertyville, IL (US)

(73) Assignee: H.C. Starck Inc. (DE)

( * ) Notice: Subject to any disclaimer, the term of this patent is extended or adjusted under 35 U.S.C. 154(b) by 574 days.

This patent is subject to a terminal disclaimer.

(21) Appl. No.: 10/872,998

(22) Filed: Jun. 21, 2004

(65) Prior Publication Data

US 2005/0279187 A1 Dec. 22, 2005

(51) Int. Cl.
*B22F 9/20* (2006.01)

(52) U.S. Cl. ................. 75/351; 75/369; 423/594.17

(58) Field of Classification Search ................. 75/351, 75/369

See application file for complete search history.

(56) References Cited

U.S. PATENT DOCUMENTS

| | | | |
|---|---|---|---|
| 1,602,542 A | 10/1926 | Marden | |
| 1,728,941 A | 9/1929 | Marden et al. | |
| 2,516,863 A | 8/1950 | Gardner | 75/84 |
| 2,881,067 A | 4/1959 | Hivert et al. | 75/0.5 |
| 2,950,185 A | 8/1960 | Hellier et al. | 75/0.5 |
| 3,647,420 A | 3/1972 | Restelli | 75/84 |
| 3,658,507 A | 4/1972 | Gohin et al. | 75/0.5 B |
| 4,045,216 A * | 8/1977 | Meyer et al. | 75/416 |
| 4,954,169 A | 9/1990 | Behrens | 75/228 |
| 5,330,557 A * | 7/1994 | May | 75/623 |
| 5,356,120 A | 10/1994 | König et al. | 266/175 |
| 6,136,062 A * | 10/2000 | Loffelholz et al. | 75/369 |
| 6,171,363 B1 | 1/2001 | Shekhter et al. | 75/369 |
| 6,849,104 B2* | 2/2005 | Shekhter et al. | 75/351 |
| 2002/0066338 A1* | 6/2002 | Shekhter et al. | 75/245 |

FOREIGN PATENT DOCUMENTS

GB 2 231 883 11/1990

* cited by examiner

*Primary Examiner*—George P. Wyszomierski
(74) *Attorney, Agent, or Firm*—Connelly Bove Lodge +Hutz LLP

(57) ABSTRACT

A method of producing a refractory metal powder by (A) combining (i) an oxide particle component and (ii) a reducing agent; (B) forming a substantially uniform mixture of (i) and (ii); (C) continuously feeding the mixture into a furnace; (D) igniting the mixture at a reaction zone and starting a reaction that is sufficiently exothermic to form a high temperature flash; (E) starting a reaction that is sufficiently exothermic to form a high temperature self-sustaining flash; and (F) producing a free-flowing reduced oxide powder.

42 Claims, 7 Drawing Sheets

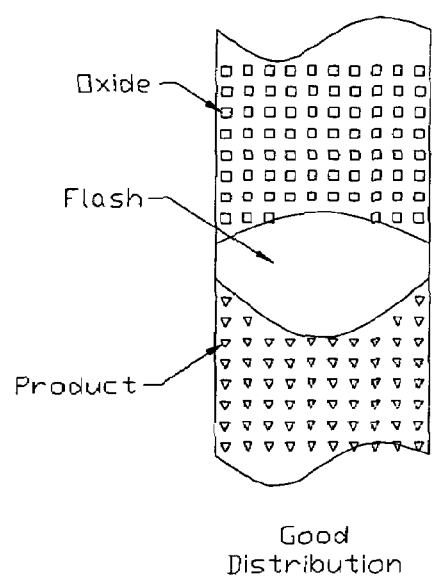
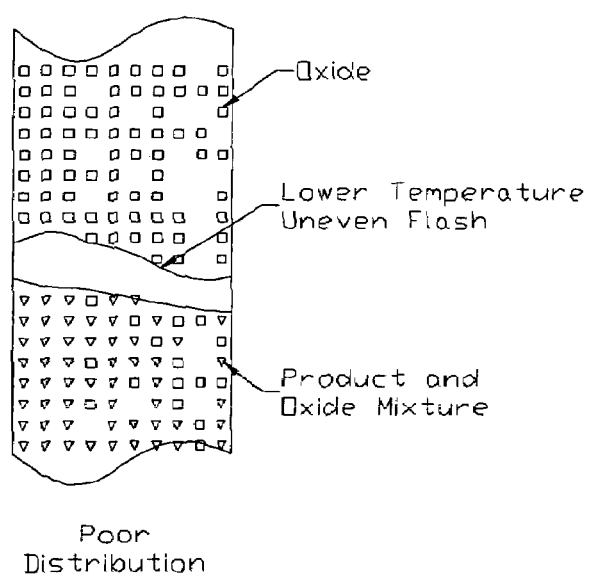
FIG. 2A
Good Distribution
FIG. 2B
(Prior Art)
Poor Distribution

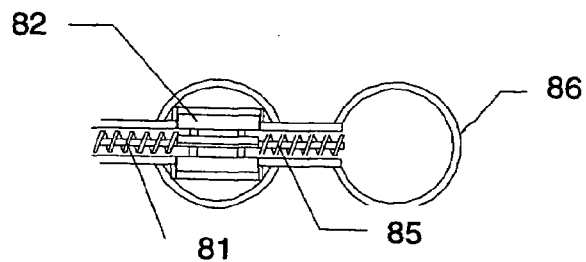
FIG. 3A
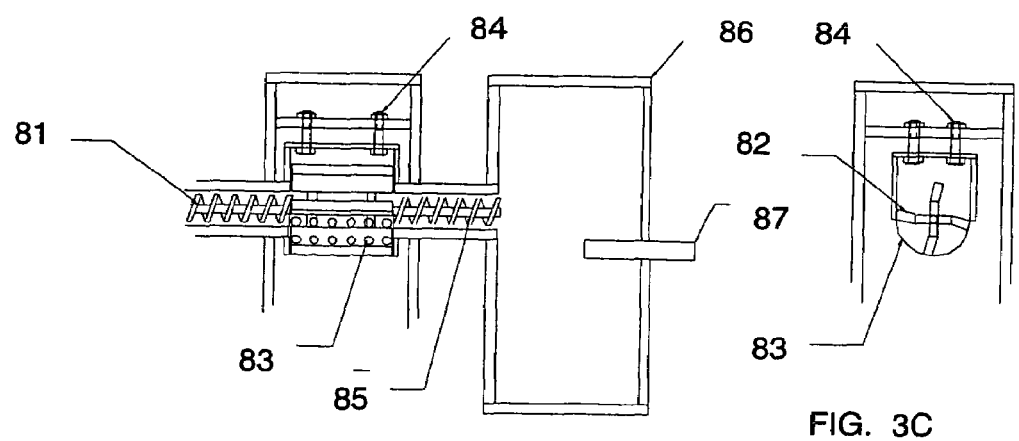
FIG. 3B
FIG. 3C

METALOTHERMIC REDUCTION OF REFRACTORY METAL OXIDES

FIELD OF THE INVENTION

This invention relates to the production of tantalum, niobium and other refractory or valve metal powders, as well as metal suboxide powders or alloys thereof, by the reduction of the corresponding metal oxide with chemically active metals, such as Mg, Ca, Al and other reducing elements, in a self-sustaining reaction zone created by a highly exothermic reaction, but with sufficient control to obtain powders of desired morphology and other physical and electrical characteristics.

BACKGROUND OF THE INVENTION

Refractory metals are members of a group of elements that are difficult to isolate in pure form because of the stability of their compounds, such as oxides, chlorides and fluorides. Since the manufacturing of refractory metals is very complex, we will use tantalum extractive metallurgy as an example to illustrate the development of this technology.

State of the art tantalum powder production is based on the process of reducing potassium heptafluorotantalate ($K_2TaF_7$) with sodium (sodium reduction). The modern method for manufacturing tantalum was developed by Hellier and Martin (U.S. Pat. No. 2,950,185). A molten mixture of $K_2TaF_7$ and a diluent salt, typically NaCl, KF and/or KCl, is reduced with molten sodium in a stirred reactor. The manufacturing process requires the removal of the solid reaction products from the retort, separation of the tantalum powder from the salts by leaching with dilute mineral acid, and treatments like agglomeration and deoxidation to achieve specific physical and chemical properties. While the reduction of $K_2TaF_7$ with sodium has allowed the industry to make high performance, high quality tantalum powders primarily used in solid tantalum capacitor manufacturing, there are several drawbacks to this method. It is a batch process prone to the inherent variability in the system; as a result, batch-to-batch consistency is difficult. Using diluent salts adversely impacts the throughput. The removal of chlorides and fluorides in large quantities presents an environmental issue. Of fundamental significance, the process has evolved to a state of maturity such that a significant advance in the performance of the tantalum powder produced is unlikely.

Over the years, numerous attempts were made to develop alternate ways for reducing tantalum compounds to the metallic state (U.S. Pat. Nos. 1,602,542; 1,728,941; 2,516,863; 3,647,420; and 5,356,120). Among these was the use of active metals other than sodium, such as calcium, magnesium, and aluminum, and raw materials such as tantalum pentoxide and tantalum chloride.

Konig et al. (U.S. Pat. No. 5,356,120) developed a vertical device for producing finely-divided metal powders (Ta, Nb, W, Zr, etc.) and metal compounds (TiN, TiC, $Nb_2O_5$) by reducing the corresponding metal chloride with hydrogen, methane or ammonia. While this technique allows continuous production, the generation of large quantities of hydrochloric acid presents serious corrosion and environmental problems. The chlorides are very hydroscopic and, therefore, require special handling with an inert and dry atmosphere. In addition, some of the metal chlorides are very expensive.

Kametani et al. (GB 2231883) developed a process for reducing gaseous titanium tetrachloride with atomized molten magnesium or sodium in a vertical type reactor in the temperature range of 650-900° C. Though the reaction was very exothermic, it was not self-sustaining due to a special effort designed to avoid the formation of titanium-iron intermetallic compounds at high temperatures (the melting point of Fe—Ti eutectic is 1080°).

U.S. Pat. Nos. 1,602,542, 3,658,507 and 2,881,067 suggest the use of gaseous magnesium to better control the process parameters. The gaseous reducing agent was generated in-situ from a mixture of metal oxide and reducing agent, or outside the reactor enclosure. Patentees managed to produce at bench scale fine zirconium, titanium, tungsten, molybdenum and chromium powders. The method was of batch type. The only controlled parameter was the magnesium (calcium) partial pressure. The kinetics and the temperature of the charge were a function of the gaseous magnesium (calcium) flow rate and were impossible to control due to the condensation of magnesium (calcium) on the cold parts of the reactor. Since both melting and evaporation of Mg (Ca) without condensation on the cold parts was practically impossible, the process had to be periodically stopped for the removal of the buildup. Therefore, continuous operation could not be carried out.

Our own experience has been that the production and transport to the reaction zone of a gaseous metal like magnesium is extremely difficult. The metal will condense at any cold spot in the transfer plumbing to form a plug. The metal attacks the container to degrade its integrity over time, creating a significant maintenance problem. Control of the reducing agent stoichiometry in the reaction zone is difficult, as it requires maintaining a measured flow rate of a gaseous metal/carrier gas (argon) mixture of known composition into the reactor.

Restelli (U.S. Pat. No. 3,647,420) developed a process for producing niobium and tantalum powders by the reduction of the corresponding oxides with carbon in vacuum. Since the Gibbs Free Energy for the carbothermic reduction reaction of $Ta_2O_5$ becomes negative at approximately 1500° C., the reaction requires high temperature, and particle sintering occurs, thus reducing the surface area of the powder. Another significant drawback of the proposed technology was contamination of the metal powders with carbon, making it very difficult to use them for capacitor manufacturing.

Numerous attempts were made to produce tantalum and niobium powders by metalothermic reduction of their oxides with Mg, Al or Ca in a bomb type reactor (U.S. Pat. Nos. 1,728,941 and 2,516,863). A blend of finely-divided oxide and metal reducing agent was placed into a reactor and then ignited. The temperature could not be controlled and therefore it was not possible to achieve reproducible physical and chemical properties of the metal powders. The residual Mg (Al, Ca) content was high due to the formation of tantalates and niobates. The process was found to be unsuitable for manufacturing high quality capacitor grade powders.

Shekhter et al. (U.S. Pat. No. 6,171,363) described a method for controlled reduction of tantalum and niobium oxide with gaseous magnesium to produce capacitor grade tantalum and niobium powders (batch magnesium reduction). The key is control of the reaction process to achieve essentially isothermal conditions. The batch magnesium reduction process requires excess amount of magnesium to compensate for its condensation on the cold parts of the furnace.

It is a principle object of the present invention to provide a new process for producing high performance, high quality tantalum, niobium, and other refractory metals and blends or alloys thereof by reducing solid/liquid metal oxides in a steady, self-sustaining reaction zone, thereby eliminating one or more, and preferably all, of the problems associated with the traditional double salt reduction and other processes described above.

It is a further object of the invention to provide a controlled, continuous production method of reduction.

It is a further object of the present invention to provide a reduction method that produces a high quality refractory metal by eliminating halide by-products and carbon contamination.

It is a further object of the invention to provide improved metal forms.

It is a further object of the invention to provide a metal powder having an improved uniform morphology.

SUMMARY OF THE INVENTION

The present invention is directed to a method of producing a refractory metal powder by (A) combining (i) an oxide particle component and (ii) a reducing agent; (B) forming a substantially uniform mixture of (i) and (ii); (C) continuously feeding the mixture into a furnace; (D) igniting the mixture at a reaction zone and starting a reaction that is sufficiently exothermic to form a high temperature flash; (E) starting a reaction that is sufficiently exothermic to form a high temperature self-sustaining flash; and (E) producing a free-flowing reduced oxide powder.

The present invention is also directed to a method of producing a refractory metal powder by (A) combining (i) an oxide particle mixture containing oxide particles selected from the group consisting of refractory metal oxide particles, refractory metal alloy oxide particles, refractory metal suboxide powders, refractory metal alloy suboxide powders and mixtures thereof and (ii) a reducing agent selected from the group consisting of magnesium, aluminum, calcium and mixtures thereof; (B) forming a substantially uniform mixture of (i) and (ii); (C) continuously feeding the mixture into a furnace; (D) igniting the mixture at a reaction zone and starting a reaction that is sufficiently exothermic to form a high temperature flash; and (E) producing a free-flowing reduced oxide powder selected from the group consisting of refractory metal powders, refractory metal alloy powders and mixtures thereof. The mixture is introduced at a consistently constant rate and the second temperature remains substantially constant.

The present invention is additionally directed to a method of producing a refractory metal powder by (A) combining (i) an oxide particle mixture containing oxide particles selected from the group consisting of refractory metal oxide particles, refractory metal alloy oxide particles, refractory metal suboxide powders, refractory metal alloy suboxide powders and mixtures thereof and (ii) a reducing agent selected from the group consisting of magnesium, aluminum, calcium and mixtures thereof; (B) forming a substantially uniform mixture of (i) and (ii); (C) reducing the free-flowing mixture in a reaction zone by heating the mixture in a reaction vessel to create a highly exothermic reaction, the exothermic reaction being triggered by heating the mixture to an ignition temperature or by adding a further reagent or catalyst; and (D) recovering a high surface area powder, substantially free of impurities, which is selected from the group consisting of refractory metal powders, refractory metal alloy powders, refractory metal suboxide powders and refractory metal alloy suboxide powders.

BRIEF DESCRIPTION OF THE DRAWINGS

FIGS. 2A and 2B are schematics showing oxide particles distributed across a tubular reactor;

FIGS. 3A, 3B and 3C show schematic diagrams of a horizontal screen disperser that can be used in the present invention;

DETAILED DESCRIPTION OF THE INVENTION

Figure 1:
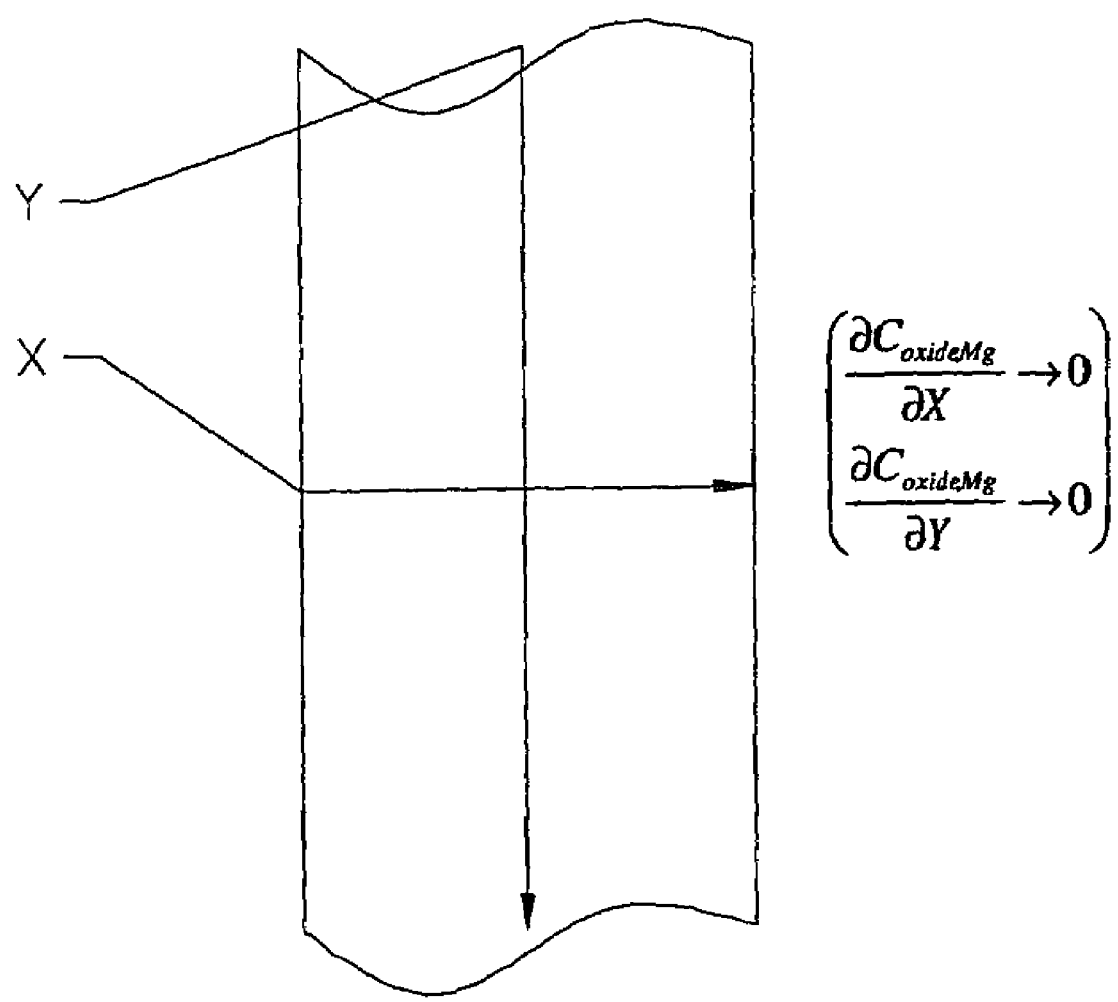
FIG. 1 is a schematic showing the concentration of the reagents in the present invention across and along a tubular reactor.

Other than in the operating examples or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

The ability of different reactions to become self-sustaining is depicted in Table 1, which shows the enthalpy for the reduction reaction of different oxides with magnesium and their adiabatic temperatures. It can be seen from Table 1 that reactions 1-9 will create a high temperature flash that, under certain conditions discussed below, will become self-sustaining, while reaction 10 does not release enough thermal energy to propagate itself.

The adiabatic temperature is the maximum temperature reached provided that the reaction is carried out in the isolated system (no energy or mass exchange with the surroundings). While the reactor system of this invention is not adiabatic, it can approach this condition because of the extremely rapid reaction rate and, therefore, there is insufficient time for significant energy and mass exchange with the surroundings. The actual temperature of the flash formed by the exothermic reaction is a function of many variables, some of which, like thermal energy losses and carrier gas enthalpy, have a thermodynamic origin, while others, like ignition temperature, particle size and surface area of the reagents, correlate to the reaction kinetics.

TABLE 1

Summary of calculated adiabatic temperatures

| Number | Oxide | $\Delta H_{25° C.}$ Kcal/mole oxide | Adiabatic Temperature (° C.) |
|---|---|---|---|
| 1 | $Ta_2O_5$ | −229 | 2832 |
| 2 | $Nb_2O_5$ | −264 | 2832 |
| 3 | $NbO_2$ | −97 | 2798 |
| 4 | NbO | −43 | 2241 |
| 5 | $Cr_2O_3$ | −158 | 2708 |
| 6 | $WO_3$ | −230 | 3437 |
| 7 | $V_2O_5$ | −348 | 2990 |
| 8 | $MoO_3$ | −253 | 3813 |
| 9 | $MoO_2$ | −147 | 2946 |
| 10 | $ZrO_2$ | −25 | 862 |

The present invention also shows that the self-sustaining reaction zone position and its temperature can be efficiently controlled by maintaining a consistent feeding rate, ignition (furnace) temperature, and inert carrier gas flow rate. Achieving a consistent oxide flow is not a trivial issue since some of the refractory metal oxides are dielectrics and have a natural tendency to accumulate static electricity due to the friction of the oxide particles against each other. The formation of agglomerates of individual oxide particles makes it virtually impossible to maintain a consistent feeding over time and adversely impacts both the kinetics and the control of the reduction reaction.

We discovered that feeding a blend of oxide and metal powder (Mg, Ca, Al, etc.) helps to dissipate the static electricity and break up the agglomerates. The metal powder should be fine enough to vaporize/melt rapidly in the reaction zone. In the present invention, the metal oxides and reducing agents are combined, forming a uniform mixture. The uniform mixture is then evenly and uniformly distributed across the cross section furnace. As a result of the use of a uniform mixture, material flowability is significantly improved. This permits a stable, consistent self-sustaining reduction reaction to occur.

The reaction zone temperature increases as the feeding rate goes up. When the feeding rate is low enough, the amount of energy released during the reaction is less than the value of energy losses. The reaction cannot sustain itself and it is impossible to achieve a stable self-sustaining reaction with a complete reduction of the metal oxide.

For each exothermic reaction, there is a starting (ignition) temperature at which the reaction becomes a self-sustaining one. For example, the ignition temperature is approximately 600° C. for the reaction of $Ta_2O_5$ with Mg. The energy required for the ignition of the reagents comes from the furnace (see Examples). The energy required to make the reaction self-sustaining comes from the chemical energy released by the reduction reaction.

It is advisable that the reaction zone temperature should not exceed the melting point of the oxide (See Table 2) because if the oxide melts, it can cause the coalescence of particles. Particle augmentation will lead to a significant decrease in the residence time in the reaction zone, which in turn will affect the completion of the reaction.

TABLE 2

The melting point of various metal oxides

| Oxide | Melting Point (° C.) |
| --- | --- |
| $Nb_2O_5$ | 1512 |
| $Ta_2O_5$ | 1785 |
| $NbO_2$ | 1902 |
| NbO | 1937 |

Even though the reduction reaction takes place in a wide temperature range (onset-flash temperature), physical and chemical properties can be kept under control due to the steady parameters of the self-sustaining reaction zone. The higher the temperature, the more agglomerated the powder, and the lower the surface area.

In the present process, the reducing agent (Mg, Al, Ca, etc.) does not need to be in gaseous form. The reduction reaction usually starts when the reducing agent is in the solid or liquid state. When the reaction zone temperature exceeds the boiling point of the reducing agent, the oxide will be reduced with gaseous metal. When the boiling point of the reducing agent is higher than the reaction zone temperature, it will be in a molten state (See Table 3), but can still have sufficient vapor pressure to sustain the reaction.

TABLE 3

The melting and boiling points of various metals

| Metal | Melting Point (° C.) | Boiling Point (° C.) |
| --- | --- | --- |
| Ca | 839 | 1483 |
| Al | 660 | 2467 |
| Mg | 650 | 1105 |

Different types of equipment can be used to run the present process continuously, such as a vertical tube furnace, a rotary kiln, a fluid bed furnace, a multiple hearth furnace, and an SHS (self-propagation high-temperature synthesis) reactor.

Thus, the present method of producing a refractory metal powder includes (A) combining (i) an oxide particle component and (ii) a reducing agent; (B) forming a substantially uniform mixture of (i) and (ii); (C) continuously feeding the mixture into a furnace; (D) igniting the mixture at a reaction zone and starting a reaction that is sufficiently exothermic to form a high temperature flash; and (E) producing a reduced oxide powder.

As used herein, the phrase "substantially uniform mixture" refers to the mixture, in that the distribution of each component is approximately the same throughout the mixture. In other words, a sample from one portion of the mixture will have approximately the same ratio of components as a sample from a different portion of the mixture.

In the present invention, a substantially uniform mixture is continuously fed to a furnace, which is key to providing uniform and effective dispersion in the method of the invention. Dispersion provides a uniform distribution of particles within the cross-sectional area of the reaction zone. A substantially uniform mixture dispersed uniformly within the reaction zone allows for high reduction efficiency.

In the present invention, it was found that the uniform dispersion of all reagents, within the reaction tube, is also critical to the formation of a stable flash and achieving complete reduction of the oxide. Another important variable is the oxide particle/agglomerate size. It is critical for the oxide agglomerate size to be within a range that permits complete reduction within the high temperature self-sustaining reaction zone.

In an embodiment of the invention, the concentration of the reagents, primarily the oxides, across and along the reactor is consistent. In other words, partial derivatives of the oxide concentration over the vertical and horizontal axes must approach zero as shown in FIG. 1. Uniform dispersion provides simultaneous ignition and reaction across the reactor. This results in uniform and completely reduced tantalum/niobium powders.

FIGS. 2A and 2B contrast the situations where uniform dispersion is obtained (FIG. 2A), as in the present invention, and where it is not (FIG. 2B). When uniform dispersion is obtained an even flash results and pure reduced tantalum/niobium powders are provided. When the dispersion is not uniform, a lower temperature, uneven flash results and the resulting product is a mixture of reduced tantalum/niobium powders and unreduced oxide.

In an embodiment of the invention, the components are free flowing. As such, the oxide particle component (i) can be free flowing, the reducing agent component (ii) can be free-flowing, the mixture formed between (i) and (ii) in step (B) can be free-flowing, and the reduced oxide powder can be free-flowing. "Free-flowing" means that the components and/or mixture are characterized by easy freedom in movement, i.e., being made up of discrete particles that move independently of each other.

As used herein, the phrase "continuously feeding the mixture" infers that the mixture is fed to the reactor during the entire process, i.e., a stream of particles is fed and the particles are not dumped, all at one time, into the reactor.

In an embodiment of the invention, the flash formed in (D) is self-sustaining.

In an embodiment of the invention, the furnace has a cross-sectional area, and the mixture formed in (C) is fed such that it is uniformly distributed across the cross-sectional area of the furnace. As used herein, the phrase "uniformly distributed" indicates that at any given location across the cross-sectional area of the furnace, approximately the same number of particles will be entering the furnace, per unit time, as any other location across the cross-sectional area of the furnace.

In another embodiment of the invention, the oxide particles in (i) are selected from metal oxide particles, metal alloy oxide particles, refractory metal suboxide powders, refractory metal alloy suboxide powders and mixtures thereof.

In a further embodiment of the invention, the reducing agent (ii) is selected from magnesium, aluminum, calcium and mixtures thereof.

In an additional embodiment of the invention, the reduced oxide powder is selected from refractory metal powders, refractory metal alloy powders, refractory metal suboxide powders, refractory metal alloy suboxide powders and mixtures thereof.

In the present invention, the uniform mixture of (i) and (ii) is charged to a furnace using a dispersing means. In an embodiment of the invention, the dispersing means is selected from a horizontal screen disperser, an impact de-agglomerator, a rotating disc disperser, a rotor/stator disperser, a blender and a mixer or any other suitable dispersing device known in the art.

A non-limiting example of a horizontal screen disperser is shown in FIGS. 3A, 3B and 3C. In the horizontal screen disperser, powder is fed into the disperser, typically using auger 81. Screeding devices 82 are fixed to a rotating, horizontal shaft. The screeding devices can be blades, rollers or other suitable shapes. The blades in screeding device 82 can be mounted in contact with or in close proximity to a screen 83 that encompasses part of or the entire cylinder described by the motion of the blades. The clearance between the screen and the blades can be adjusted using adjustments 84. The turning blades in screening device 82 force the powder through screen 83 and into the furnace entrance. The blades can be driven by the feeder or can be powered separately. In the event that the screen blinds, or tramp material is present, an outlet auger 85 can be utilized. The outlet auger 85 can feed into a collection container 86, which would be alarmed with a level sensor 87.

Figure 4:
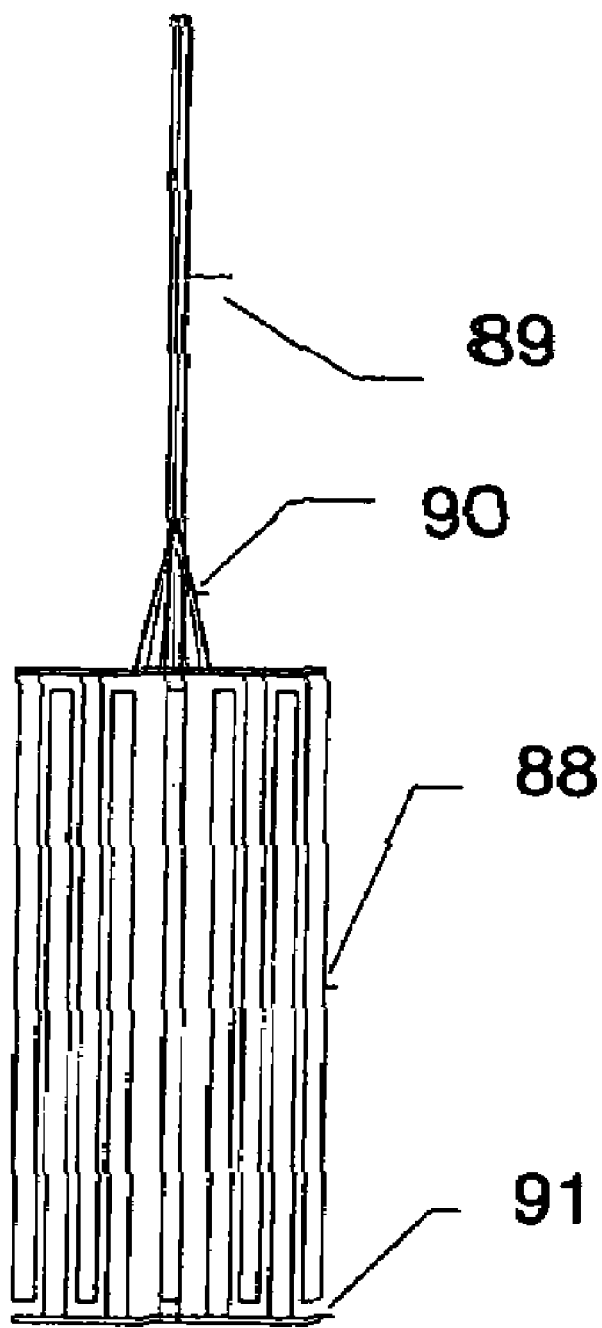
FIG. 4 shows a schematic diagram of an impact de-agglomerator that can be used in the present invention.

A non-limiting example of an impact de-agglomerator is shown in FIG. 4. The impact de-agglomerator is an impact device that de-agglomerates the powder stream without the use of a screen. The powder is fed into the top of the disperser and a plurality of impacting blades 88 are affixed to a rotating shaft 89. The blades 88 strike each part of the powder one or more times as it is falling through. An inverted cone 90, or other suitable shape, can be mounted over the top of the disperser. This will direct the powder to the outer portion of the blades, which have sufficient angular velocity to de-agglomerate the powder stream. A lower assembly of blades 91 can be added to improve de-agglomeration. The lower assembly can be stationary or counter rotating. The blades can have horizontal projections to aid in the de-agglomeration of the powder stream. A sleeve will often surround the blades to direct the powder flow. The number of impacts a segment of the powder stream will receive is governed by height and rotation speed. The shape and clearance of the blades is specific to the powder feed and degree of de-agglomeration required.

A non-limiting example of a rotating disc disperser includes those that include a mass flow funnel, a mass flow feed screw system, a disperser chamber with a built in leveling system, a material level sensor and a rotating disc drive system. In a particular example, the disperser includes a rotating disk with 16 uniform radial slots, each of approximately 1/8" (about 0.31 cm) width. The rotating disk is fitted against a changeable screen and a fixed and rotating leveling armature mounted above the rotating disk. The important element in the design of the armature is a blade structure, the primary function of which is to insure a uniform dispersion of the feed blend over the entire surface of the rotating disk, constant bed height and constant head pressure. The rotating armature and rotating disk are mounted on the same motor drive shaft. The leveling armature maintains a constant head pressure on the rotating disk/screen assembly by insuring a constant level fill of the disperser chamber. This results in a significantly improved pattern of blend feed, reduced variation in feed input, and an increase in the amount of feed around the perimeter of the pattern.

In an embodiment of the invention, the uniform mixture of (i) and (ii) is formed by loading (i) and (ii) into a mass flow funnel. In an embodiment of the invention, the specific design of the mass flow funnel is optimized for the mixture and the feed material is continuously removed in homogeneous fashion, eliminating any angle of repose. The mass flow screw then deposits the material in the dispersion chamber. The material in the chamber is allowed to build up to a prescribed level (approximately to the 60% chamber volume fill level) as indicated by a level sensor.

When the 60% fill level is realized, disk rotation is started. The leveling armature controls the level of material above the rotating disk, providing a uniform head pressure. During operation, the feed screw deposits material into the disperser chamber. The leveling armature (both fixed and rotating) provides uniform, level fill of the chamber. This head pressure serves to fill each of the 16 individual slot cutouts in the rotating disk with feed blend material. When rotated, each disk slot's trailing edge forces material through the screen. Dispersion is more complete owing to the large number of slots on the rotating disk. Material dispersion along the perimeter of the disk is increased because of this design. (Since the slots are oriented in a radial pattern, the velocity of the outer end of each slot is always greater than that of the inner end, therefore an increased amount of blend is introduced along the disk perimeter.) However, the distance between the trailing edge of an individual slot and the trailing edge of the next slot is greater at the perimeter of the disk than it is at the center of the disk. The farther from the center of the disk, the greater the velocity of any point along the trailing edge of the slot. Because of the radial configuration of the slots, the rotating disk provides a much more uniform dispersion of the blend across the entire cross section. The dispersion across the disk could be further improved or adjusted by tapering the slot cutouts, i.e., larger width at the periphery of the disk/smaller width at the center of the disk.

It is believed that an advantage of the rotating disk disperser is the built in correction of the dispersion of the mixture around the perimeter of the feed cross section, thereby providing significantly more uniform dispersion of the mixture.

An advantage of the rotating disk system is that more of the mixture is distributed around the perimeter of the feed cross section, thereby providing significantly more uniform dispersion of the mixture.

Also, the mass flow funnel and mass flow screw reduce pulsation of the mixture entering the dispersion chamber. This allows the feed rate to be stabilized and variations in the feed to be reduced.

Figure 5:
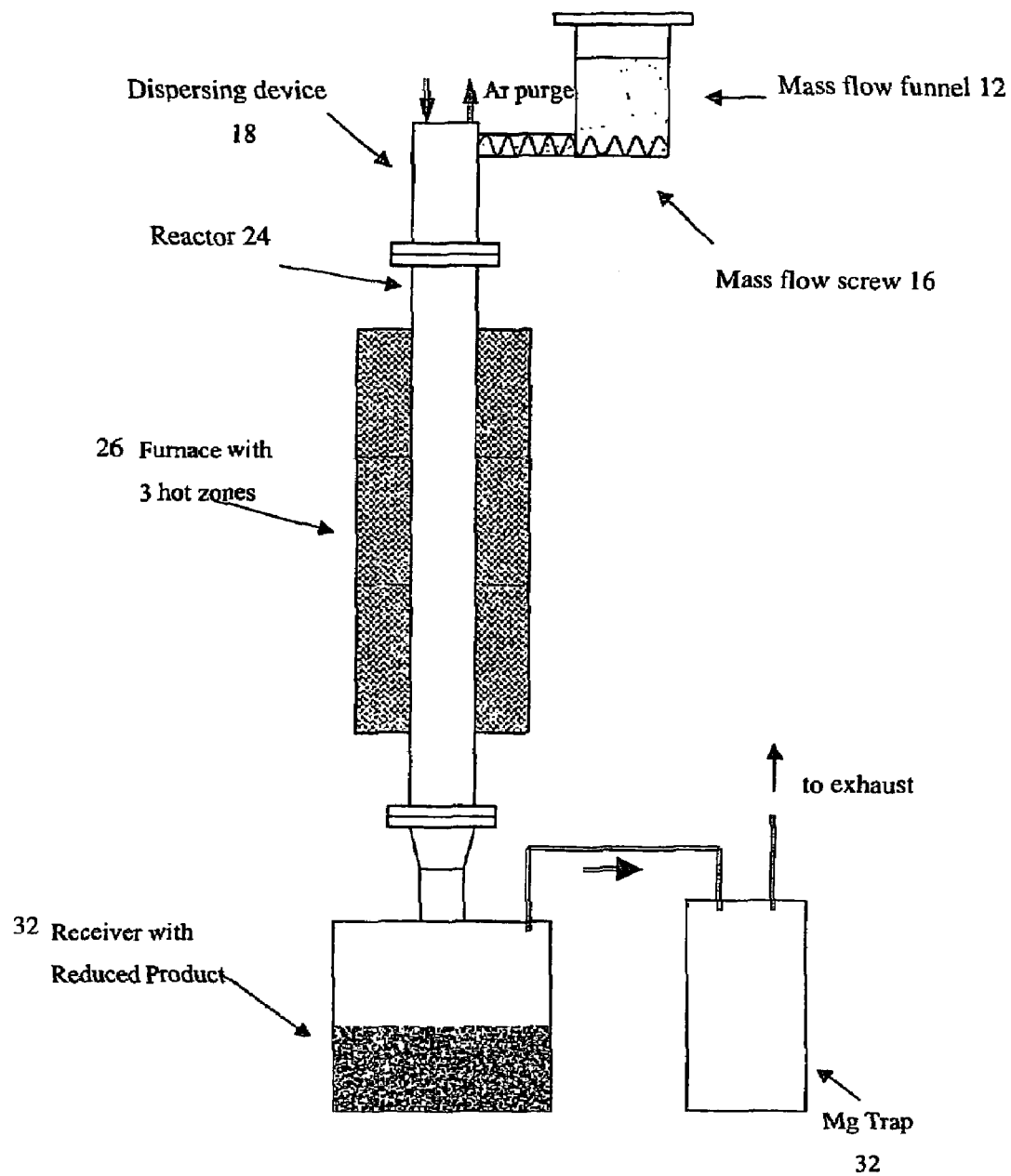
FIG. 5 shows a schematic diagram of a vertical tube furnace that can be used in the present invention.

An embodiment of the invention is shown schematically in FIG. 5, which shows an apparatus for implementing the next processing steps of the present invention. The uniform mixture is fed from mass flow funnel 12 via mass flow screw 16 to a vertical tube furnace. The mixture is consistently fed out of mass flow funnel 12 via mass flow screw 16 to dispersing device 18, which uniformly distributes the mixture across the cross-sectional area of the tube furnace in general and reactor 24 in particular. Reactor 24 is connected to dispersing device 18 and is heated by a three zone electrical furnace 26 where the self-sustaining reaction takes place, a receiver 28 connected to reactor 24 where the reduction products are collected, and a trap 32 where the unreacted (condensed) reducing agent powder is collected. The length of the reactor's hot zone can be approximately 5 feet (about 1.5 m).

For the present process, the vertical tube furnace has a number of advantages over other potential types of equipment. The vertical tube furnace configuration minimizes contact of the products with the reactor wall and allows the free flow of the reactants and products, thus minimizing interaction of the product particles. Losses due to dust formation are also minimized. The vertical tube furnace can be configured to operate continuously. The vertical tube configuration also promotes maximum exposure of the oxide to the reducing agent to achieve the reaction rate necessary to maintain a stable self-sustaining reaction.

In an embodiment of the invention, the furnace has a first temperature at a location that is not the reaction zone and the flash is at a second temperature that is greater than the first temperature. Further to this embodiment, the mixture can be introduced at a consistently constant rate and the second temperature remains substantially constant. Also, the flash can have a temperature that is less than or equal to the melting point of the refractory metal oxide or refractory alloy metal oxide.

In another embodiment of the invention, the residence time of the mixture in the reaction zone is $T_R$ and can be expressed as:

$$T_R = d/(gD^2(\rho_p - \rho_f)/18\mu)$$

wherein:

d is the length of the reaction zone, g is the acceleration due to gravity,

D is the average particle diameter of the particles in the mixture, $\rho_p$ is the density of the particles in the mixture, and $\rho_f$ is the density of the fluid through which the mixture falls, and $\mu$ is the dynamic viscosity of the gas in the furnace.

In an embodiment of the invention, the gas in the furnace is inert, i.e., free of oxygen. Non-limiting examples of gasses that can be used include the noble gasses, such as neon or argon.

In another embodiment of the invention, the mixture includes agglomerates having a substantially uniform particle size distribution.

Typically in the invention, the particles in the mixture have an average particle size of less than 600 μm as determined by laser light scattering. However, the particle size of the particles in the mixture can be at least 0.001 μm, in some cases at least 0.01 μm and in other cases at least 0.1 μm. Also, the particles in the mixture have an average particle size of less than 600 μm, in some cases less than 500 μm, in other cases less than 400 μm, in some instances less than 300 μm, in other instances less than 200 μm, in some situations less than 100 μm and in other situations less than 50 μm. The average particle size can be any value or range between any values recited above. As a non-limiting example, the particle size can be measured using light scattering, which provides a weight average value. As an example, the average particle size can be measured using the MASTERSIZER 2000 available from Malvern Instruments Limited, Worcestershire, UK.

In an embodiment of the invention, at least one process parameter can be adjusted to control the chemical and physical properties of the powder. The process parameters can be selected from reagent feed rates, ignition temperature, steady state energy supply, reagent particle size, reducing agent stoichiometry and inert carrier gas flow rate.

In an embodiment of the invention, d, the length of the reaction zone, can be at least 0.1 m, in some cases at least 0.25 m and in other cases at least 0.5 m in length. Also, the length of the reaction zone can be up to 15 m, in some cases up to 10 m, in other cases up to 5 m, in some situations up to 2 m and in other situations up to 1.5 m in length. The length of the reaction zone can be any value or range between any values recited above.

In an embodiment of the invention, the residence time of the mixture in the reaction zone, $T_R$, can be at least 0.1 seconds, in some cases at least 0.25 seconds, in other cases at least 0.5 seconds and in some situations at least 1 second. Also, the residence time of the mixture in the reaction zone can be up to 20 minutes, in some cases up to 10 minutes, in other cases up to 5 minutes, in some situations up to 120 seconds, in other situations up to 60 seconds, in some instances up to 30 seconds and in other instances up to 10 seconds. The residence time of the mixture in the reaction zone can be any value or range between any values recited above.

In an embodiment of the invention, the bulk density, $\rho_m$, of the mixture can be at least 0.05, in some cases at least 0.06, in other cases at least 0.9 and in some situations at least 1 g/cm$^3$. Also, the bulk density $\rho_m$ of the mixture can be up to 6, in some cases up to 5, in other cases up to 4, in some situations up to 3, and in other situations up to 2 g/cm$^3$. The bulk density $\rho_m$ of the mixture can be any value or range between any values recited above.

A particular embodiment of the invention provides a method of producing a refractory metal powder. The method includes:

(A) combining (i) an oxide particle mixture containing oxide particles selected from refractory metal oxide particles, refractory metal alloy oxide particles, refractory metal suboxide powders, refractory metal alloy suboxide powders and mixtures thereof and (ii) a reducing agent selected from magnesium, aluminum, calcium and mixtures thereof;

(B) forming a substantially uniform mixture of (i) and (ii);

(C) continuously feeding the mixture into a furnace;

(D) igniting the mixture at a reaction zone and starting a reaction that is sufficiently exothermic to form a high temperature flash; and (E) producing a free-flowing reduced oxide powder selected from refractory metal powders, refractory metal alloy powders and mixtures thereof. Typically, the mixture is introduced at a consistently constant rate and the second temperature remains substantially constant.

A further particular embodiment of the invention provides a method of producing a refractory metal powder that includes:

(A) combining (i) an oxide particle mixture containing oxide particles selected from refractory metal oxide particles, refractory metal alloy oxide particles, refractory metal suboxide powders, refractory metal alloy suboxide powders and mixtures thereof and (ii) a reducing agent selected from magnesium, aluminum, calcium and mixtures thereof;

(B) forming a substantially uniform mixture of (i) and (ii);

(C) reducing the free-flowing mixture in a reaction zone by heating the mixture in a reaction vessel to create a highly exothermic reaction, the exothermic reaction being triggered by heating the mixture to an ignition temperature or by adding a further reagent or catalyst; and (D) recovering a high surface area powder, substantially free of impurities, which is selected from the group consisting of refractory metal powders, refractory metal alloy powders, refractory metal suboxide powders and refractory metal alloy suboxide powders, which can optionally be exposed to agglomerating and/or deoxidizing operations.

In the various embodiments of the invention, the oxide particle component (i) can be free-flowing, the reducing agent component (ii) can be free-flowing, and the mixture formed in (B) can be free-flowing. Also, in an aspect of this embodiment, the flash formed in (D) can be self-sustaining. Also, the furnace can be a vertical tube furnace and can have a cross-sectional area, and the mixture formed in (C) can be fed such that it is uniformly distributed across the cross-sectional area of the furnace.

In the various embodiments of the invention, the refractory metal oxide component can be selected from tantalum pentoxide, niobium pentoxide, niobium suboxide, tungsten trioxide, chromium trioxide, molybdenum trioxide, titanium dioxide, vanadium pentoxide and niobium oxide, mixtures of at least one of the foregoing and zirconium dioxide, and mixtures thereof.

Also, in the various embodiments of the invention, the refractory metal powder and the refractory metal alloy powder can be selected from tantalum, niobium, molybdenum, tungsten, vanadium, chromium, titanium and combinations thereof.

Additionally, in the various embodiments of the invention, the reducing agent in the mixture can be provided in an amount substantially equal to the stoichiometric quantity required to react with the refractory metal oxide component.

Further, in the various embodiments of the invention, the temperature in the reaction zone can be less than or equal to the melting point of the refractory metal feed.

In an embodiment of the invention, the powder can be formed into pellets at an appropriate sintering temperature. Further to this embodiment, the sintered pellets can be formed into electrolytic capacitors.

The present invention is more particularly described in the following examples, which are intended to be illustrative only, since numerous modifications and variations therein will be apparent to those skilled in the art. Unless otherwise specified, all parts and percentages are by weight.

EXAMPLES

Example 1

Tantalum pentoxide was blended with solid magnesium to form a substantially uniform mixture. The mixture was continuously fed to a vertical tube furnace at 20 kg/hr. The temperature in the furnace was maintained at 1150° C. The tantalum pentoxide had a spherical morphology, bulk density of about 1.7 g/cm$^3$ (28 g/in$^3$), and a 40 μm average agglomerate size as determined by a MASTERSIZER 2000 (Malvern Instruments Limited).

A rotor/stator-type disperser was used.

Using the above arrangement, two samples of reduced oxide powders were produced. In sample (A), dispersion was practiced such that the substantially uniform mixture of oxide and reducing agent were also uniformly dispersed across the cross-sectional area of the furnace during the continuous feeding of the mixture into the furnace. In sample (B), dispersion was not practiced and the uniform mixture of oxide and reducing agent were not uniformly dispersed across the cross-sectional area of the furnace during the continuous feeding of the mixture into the furnace.

For each sample, after passivation, the receiver was opened and the products were leached with dilute sulfuric acid to remove residual magnesium and magnesium oxide. The cake was then dried in the oven at 65° C. and analyzed. The physical properties of the resulting samples are summarized in the table below.

| Powder | O | N | Fe | Ni | Cr | K + Na | Mg | Surface Area (m$^2$/g) | BD | FAPD | Reduction (%) |
|---|---|---|---|---|---|---|---|---|---|---|---|
| A | 3.1 | 414 | 8 | 5 | 5 | 11 | 1933 | 6.7 | 27.0 | 1.48 | 95 |
| B | 6.1 | 442 | 5 | 5 | 5 | 11 | 1450 | 5.7 | 27.1 | 1.50 | 75 |

Elements are in ppm unless otherwise indicated
BD = bulk density (g/cm$^3$)
FAPD = Fisher Average Particle Diameter (μ)

The data show improved reduction (95 vs. 75%) and lower oxygen levels (3.1 vs. 6.1%) when the mixture is properly dispersed and uniformly fed to the furnace.

Example 2

Samples C and D were prepared as described above, except that the feed rate of the substantially uniform mixture was 19 kg/hr. A rotating disk disperser was used.

Figure 6:
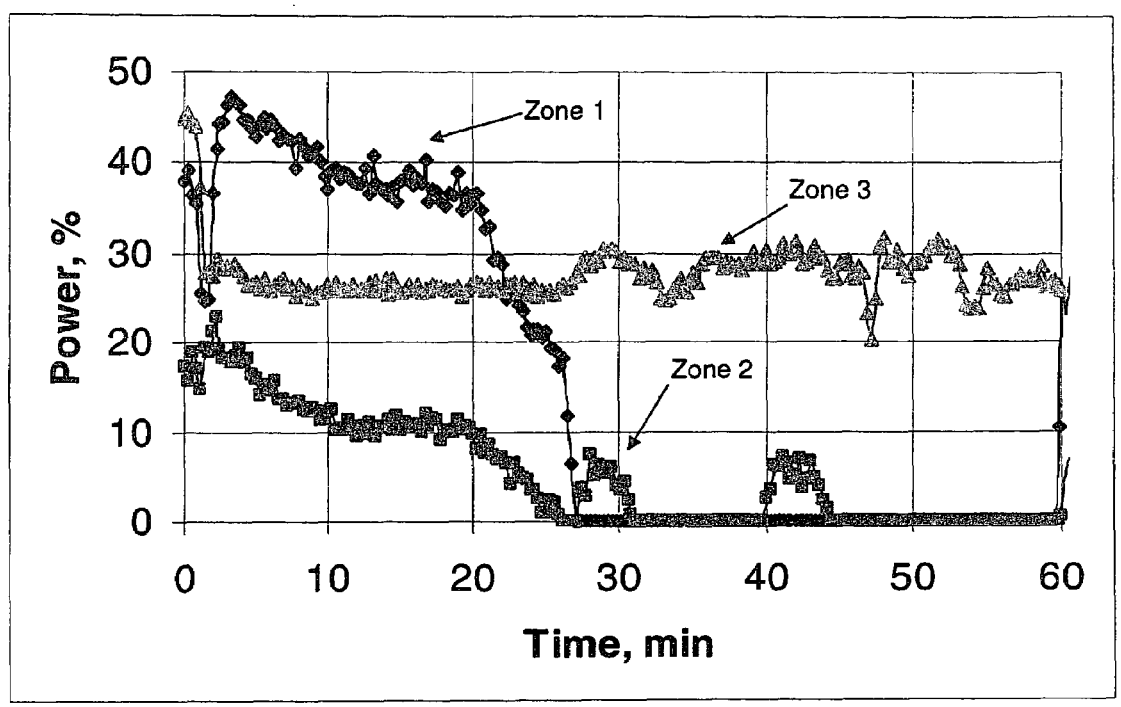
FIG. 6 shows a power curve for a reactor.
Figure 7:
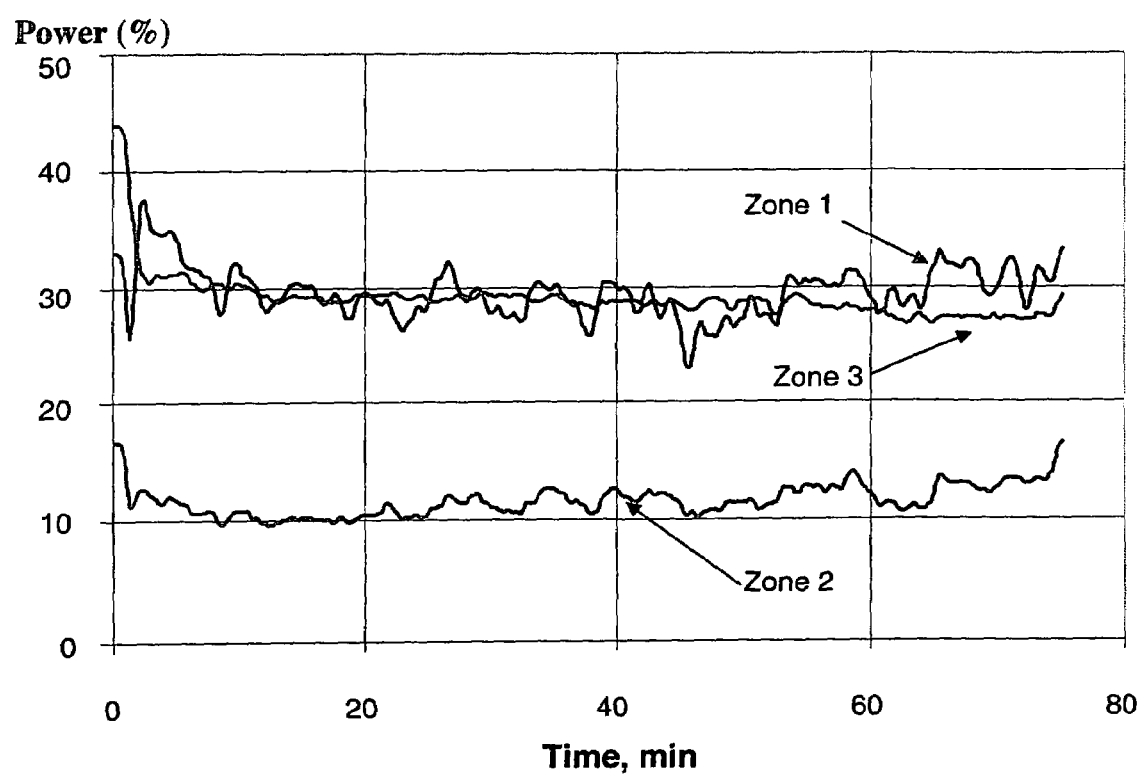
FIG. 7 shows a power curve for a reactor.

The reduction efficiency was determined by examining the power curves from the reactor for each experiment as shown in FIG. 6 (sample C) and FIG. 7 (sample D). Due to the exothermic character of the reduction, higher reduction efficiency results in less energy being required to be provided by the furnace power supply.

In sample C (FIG. 6), an effective dispersion was achieved through the optimal operation of the rotating disc disperser. As is shown in FIG. 6, both of zones one and two required no energy from the furnace power supply. This result indicates optimal dispersion.

In sample D (FIG. 7), the rotating disk disperser was not optimally configured and did not provide a mixture dispersed uniformly as in sample C. As indicated in FIG. 5, all of the zones in the furnace required energy from the power supply for the entire duration of the process.

The lower power consumption demonstrates an additional benefit of the present invention.

It is to be understood that the above-described embodiments are simply illustrative of the principles of the invention. Various and other modifications, changes, details and uses may be made by those skilled in the art which will embody the principles of the invention and fall within the spirit and scope thereof.

We claim:

1. A method of producing a refractory metal powder comprising:
   (A) blending (i) an oxide particle component which contains a refractory metal and said refractory metal is tantalum or niobium and (ii) a solid reducing agent;
   (B) forming a substantially uniform mixture of (i) and (ii);
   (C) continuously feeding the mixture into a furnace;
   (D) igniting the mixture at a reaction zone and staffing a reaction that is form a high temperature exothermic to form a high temperature flash;
   (E) starting a reaction that is sufficiently exothermic to form a high temperature self-sustaining flash; and
   (F) producing a free-flowing reduced oxide powder and wherein the furnace has a cross-sectional area and the mixture formed in (B) is fed in to the furnace in (C) by a dispersing means excluding a rotor/stator disperser, such that it is uniformly distributed across the cross-sectional area of the furnace and the residence time of the mixture in the reaction zone is from 0.1 second to 10 seconds.

2. The method according to claim 1, wherein the oxide particle component (i) is free-flowing.

3. The method according to claim 1, wherein the reducing agent component (ii) is free-flowing.

4. The method according to claim 1, wherein the mixture formed in (B) is free-flowing.

5. The method according to claim 1, wherein the flash formed in (D) is self sustaining.

6. The method according to claim 1, wherein the oxide particles in (i) are selected from the group consisting of metal oxide particles, metal alloy oxide particles, refractory metal suboxide powders, refractory metal alloy suboxide powders and mixtures thereof.

7. The method according to claim 1, wherein the reducing agent (ii) is selected from the group consisting of magnesium, aluminum, calcium and mixtures thereof.

8. The method according to claim 1, wherein the reduced oxide powder is selected from the group consisting of refractory metal powders, refractory metal alloy powders, refractory metal suboxide powders, refractory metal alloy suboxide powders and mixtures thereof.

9. The method according to claim 1, wherein the dispersing means is selected from the group consisting of a horizontal screen disperser, an impact de-agglomerator, a rotating disc disperser, a blender and a mixer.

10. The method according to claim 1, wherein the furnace has a first temperature at a location that is not the reaction zone and the flash is at a second temperature that is greater than the first temperature.

11. The method according to claim 10, wherein the mixture is introduced at a consistently constant rate and the second temperature remains substantially constant.

12. The method according to claim 1, wherein said oxide component contains a refractory metal oxide or a refractory alloy metal oxide and the flash has a temperature that is less than or equal to the melting point of the refractory metal oxide or refractory alloy metal oxide.

13. The method according to claim 1, wherein the particles in the mixture have a particle size distribution of less than 600 μm as determined by laser light scattering.

14. The method according to claim 1, wherein the reaction zone has a length from 0.1 m to 15 m in length.

15. The method according to claim 1, wherein the bulk density of the mixture is from 0.05 to 6 $g/cm^3$.

16. The method according to claim 1, wherein the furnace is a vertical tube furnace.

17. The method according to claim 1, further comprising forming the powder into pellets at an appropriate sintering temperature.

18. The method according to claim 17, further comprising forming the sintered pellets into electrolytic capacitors.

19. The method according to claim 1, wherein the method is continuous.

20. A method of producing a refractory metal powder comprising:
   (A) blending (i) an oxide particle mixture containing oxide particles selected from the group consisting of refractory metal oxide particles, refractory metal alloy oxide particles, refractory metal suboxide powders, refractory metal alloy suboxide powders and mixtures thereof and said refractory metal is tantalum or niobium and (ii) a solid reducing agent selected from the group consisting of magnesium, aluminum, calcium and mixtures thereof;
   (B) forming a substantially uniform mixture of (i) and (ii);
   (C) continuously feeding the mixture into a furnace;
   (D) igniting the mixture at a reaction zone and starting a reaction that is sufficiently exothermic to form a high temperature flash; and
   (E) producing a free-flowing reduced oxide powder group consisting of refractory metal powders, refractory metal alloy thereof;
wherein the mixture is introduced at a consistently constant rate and has a second temperature and the second temperature remains substantially constant,
and wherein the furnace has a cross-sectional area and the mixture formed in (B) is fed in to the furnace in (C) by a dispersing means excluding a rotor/stator disperser, such that it is uniformly distributed across the cross-sectional area of the furnace and the residence time of the mixture in the reaction zone is from 0.1 second to 10 seconds.

21. The method according to claim 20, wherein the oxide particle component (i) is free-flowing.

22. The method according to claim 20, wherein the reducing agent component (ii) is free-flowing.

23. The method according to claim 20, wherein the mixture formed in (B) is free-flowing.

24. The method according to claim 20, wherein the flash formed in (D) is self-sustaining.

25. The method according to of claim 20, wherein the furnace is a vertical tube furnace.

26. The method according to claim 20, wherein the method is continuous.

27. A method of producing a refractory metal powder comprising:
(A) blending (i) an oxide particle mixture containing oxide particles selected from the group consisting of refractory metal oxide particles, refractory metal alloy oxide particles, refractory metal suboxide powders, refractory metal alloy suboxide powders and mixtures thereof and said refractory metal is tantalum or niobium and (ii) a solid reducing agent selected from the group consisting of magnesium, aluminum, calcium and mixtures thereof;
(B) forming a substantially uniform mixture of (i) and (ii);
(C) reducing the free-flowing mixture in a reaction zone by heating the mixture in a reaction vessel to create a highly exothermic reaction, the exothermic reaction being triggered by heating the mixture to an ignition temperature or by adding a further reagent or catalyst; and
(D) recovering a high surface area powder, substantially free of impurities, which is selected from the group consisting of refractory metal powders, refractory metal alloy powders, refractory metal suboxide powders and refractory metal alloy suboxide powders and wherein the reaction vessel has a cross-sectional area and the mixture formed in (B) is fed in to the reaction vessel in (C) by a dispersing means excluding a rotor/stator disperser, such that it is uniformly distributed across the cross-sectional area of the reaction vessel and the residence time of the mixture in the reaction zone is from 0.1 second to 10 seconds.

28. The method according to claim 27, wherein the oxide particle component (i) is free-flowing.

29. The method according to claim 27, wherein the reducing agent component (ii) is free-flowing.

30. The method according to claim 27, wherein the mixture formed in (B) is free-flowing.

31. The method according to claim 27, wherein the reaction in (C) is self-sustaining.

32. The method according to claim 27, wherein the reaction vessel is a vertical tube furnace.

33. The method according to claim 27, wherein the refractory metal oxide component is selected from the group consisting of tantalum pentoxide, niobium pentoxide, niobium suboxide, tungsten trioxide, chromium trioxide, molybdenum trioxide, titanium dioxide, vanadium pentoxide and niobium oxide, mixtures of at least one of the foregoing and zirconium dioxide, and mixtures thereof.

34. The method according to claim 27, wherein the refractory metal powder and the refractory metal alloy powder are selected from the group consisting of tantalum, niobium, molybdenum, tungsten, vanadium, chromium, titanium and combinations thereof.

35. The method according to claim 27, wherein the temperature in the reaction zone is less than or equal to the melting point of the refractory metal feed.

36. The method according to claim 27, wherein the powder further comprises agglomerates having a substantially uniform particle size distribution.

37. The method according to claim 27, further comprising adjusting at least one process parameter to control the chemical and physical properties of the powder, wherein the process parameter is selected from the group consisting of reagent feed rates, ignition temperature, steady state energy supply, reagent particle size, reducing agent stoichiometry and inert carrier gas flow rate.

38. The method according to claim 27, wherein the reducing agent in the mixture is provided in an amount substantially equal to the stoichiometric quantity required to react with the refractory metal oxide component.

39. The method according to claim 27, further comprising forming the powder into pellets at an appropriate sintering temperature.

40. The method according to claim 39, further comprising forming the sintered pellets into electrolytic capacitors.

41. The method according to claim 27, wherein the recovering step (D) further comprises agglomerating and/or deoxidizing.

42. The method according to claim 27, wherein the method is continuous.

* * * * *